(12) United States Patent
Todd

(10) Patent No.: US 12,000,501 B2
(45) Date of Patent: *Jun. 4, 2024

(54) REMOVABLY MOUNTED ACTUATOR ASSEMBLY

(71) Applicant: M & M Oil Tools, LLC, Breaux Bridge, LA (US)

(72) Inventor: Andy Paul Todd, Lafayette, LA (US)

(73) Assignee: M & M Oil Tools, LLC, Breaux Bridge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,742

(22) Filed: Apr. 28, 2023

(65) Prior Publication Data

US 2023/0265941 A1    Aug. 24, 2023

Related U.S. Application Data

(63) Continuation of application No. 17/322,418, filed on May 17, 2021, now Pat. No. 11,674,613.

(51) Int. Cl.
*E21B 21/10*    (2006.01)
*F16K 31/163*    (2006.01)

(52) U.S. Cl.
CPC ........ *F16K 31/1635* (2013.01); *E21B 21/106* (2013.01); *E21B 2200/04* (2020.05)

(58) Field of Classification Search
CPC . E21B 21/106; E21B 2200/04; F16K 31/1635
See application file for complete search history.

(56) References Cited

U.S. PATENT DOCUMENTS

| | | | | |
|---|---|---|---|---|
| 4,046,350 A | * | 9/1977 | Massey | F16K 31/1635 137/556 |
| 4,456,217 A | * | 6/1984 | Winegeart | E21B 34/16 92/136 |
| 4,535,852 A | * | 8/1985 | Boyadjieff | E21B 21/106 175/218 |
| 5,507,467 A | * | 4/1996 | Mott | E21B 21/106 175/218 |
| 5,979,865 A | * | 11/1999 | Rabby | F15B 15/065 137/315.35 |
| 6,840,493 B2 | * | 1/2005 | York | F16K 31/122 251/250 |
| 6,848,672 B2 | * | 2/2005 | Cross | F16K 31/055 285/921 |
| 6,913,034 B2 | * | 7/2005 | Szafron | F16K 31/602 251/14 |
| 7,137,453 B2 | * | 11/2006 | Gustafson | E21B 21/106 166/85.4 |

(Continued)

FOREIGN PATENT DOCUMENTS

WO    0107811 A1    2/2001

*Primary Examiner* — Matthew R Buck
(74) *Attorney, Agent, or Firm* — Jones Walker LLP

(57) ABSTRACT

A powered actuating assembly configured for mounting on a tubular valve body. The actuating assembly includes: (a) an actuator unit configured to impart torque to the valve stem; (b) an actuator mounting plate with a first surface supporting the actuator unit and a second surface configured to engage and resist movement relative to the valve body; and (c) securing links configured to extend around a valve body surface opposite the mounting plate and secure the mounting plate to the valve body.

21 Claims, 5 Drawing Sheets

(56) References Cited

U.S. PATENT DOCUMENTS

| | | | | |
|---|---|---|---|---|
| 10,302,218 B2* | 5/2019 | Standbridge | ............ | F16K 27/067 |
| 10,487,956 B2* | 11/2019 | Meyer | .................... | F16K 31/502 |
| 11,111,759 B2* | 9/2021 | Mudigere | ............. | F16K 27/067 |
| 11,674,613 B1* | 6/2023 | Todd | ..................... | E21B 21/106 |
| | | | | 251/59 |
| 2012/0068099 A1* | 3/2012 | Sealy | .................... | F16K 31/055 |
| | | | | 251/291 |

* cited by examiner

REMOVABLY MOUNTED ACTUATOR ASSEMBLY

I. CROSS-REFERENCE TO RELATED APPLICATION

This application is a continuation of U.S. patent application Ser. No. 17/322,418, filed on May 17, 2021, which is hereby incorporated by reference in its entirety.

II. BACKGROUND

In many industries, particularly the oil and gas industry, there are various types of valves housed in a section of a tubular member (e.g., pipe), which in turn are typically positioned within a larger drill string. These sections of pipe are often referred to has a "pipe subs" or simply "subs" within the overall drill string, and when housing a valve, may be referred to as a "valve subs." FIG. 1 illustrates one typical prior art valve sub (of the kelly-valve type) such as described in U.S. Patent Publication No. 2018/0283562, filed Oct. 4, 2018, which is incorporated by reference herein.

Figure 1:
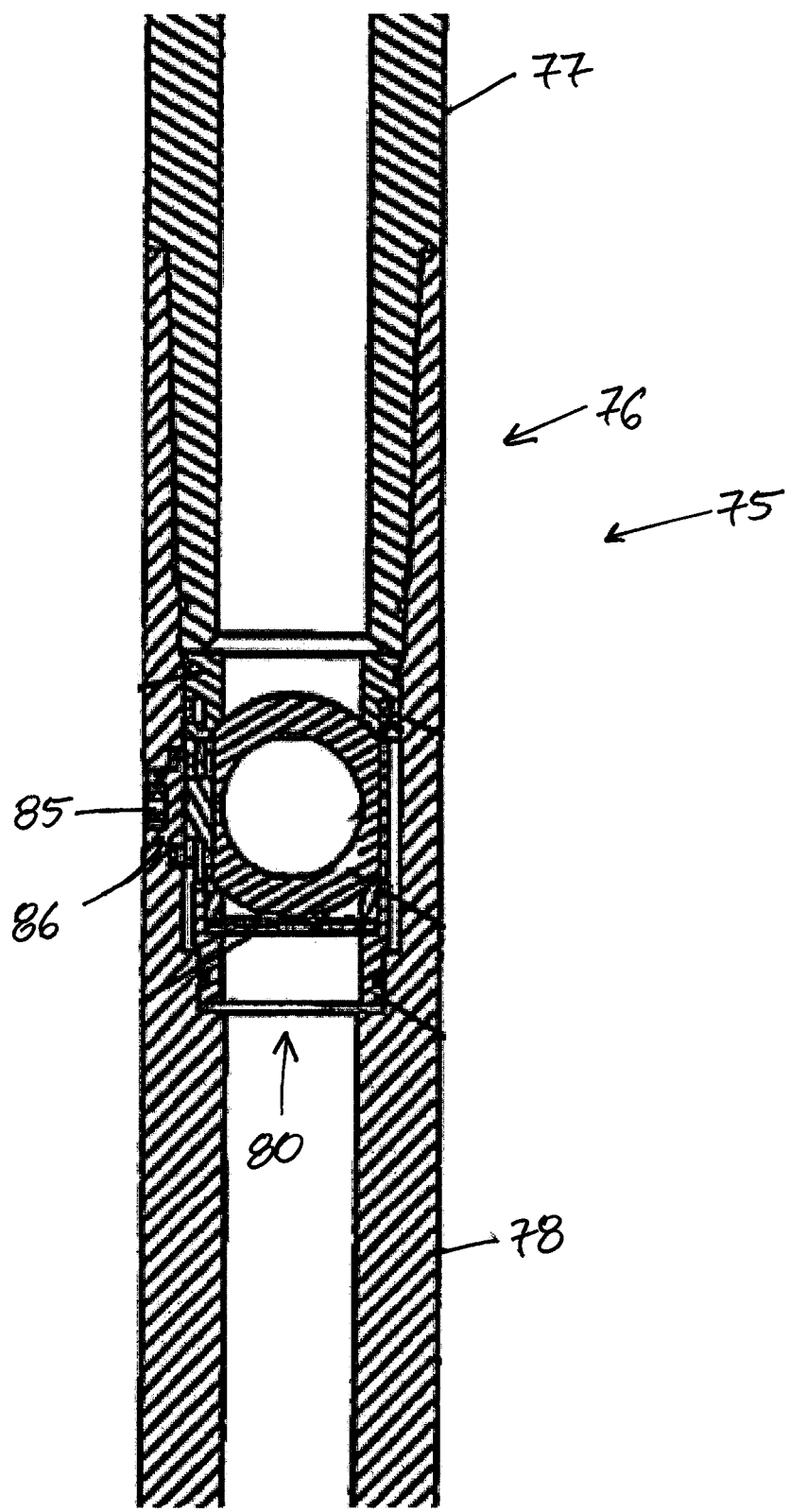

FIG. 1 shows a valve sub 75, which is formed of the sub housing 76, which is in turn formed by the connection of the pin threaded pipe 77 and the box threaded pipe 78. Positioned within sub housing 76 is the ball valve (or ball valve cartridge) 80. Ball valve 80 will be actuated by the valve stem 85 which extends through or is accessible through the stem aperture 86 formed in the sidewall of the sub housing. Typically, a rig hand will manually open or close the valve by engaging a stem socket formed in the valve stem with a conventional operating wrench having a square or hex-shaped bit or "tool head" sized to match the stem socket. The valve subs are manufactured in various "sizes," which may be specified as the nominal OD of the sub housing or alternatively, the nominal ID which equates to the passage diameter though the valve ball. Example valve sub sizes include 2¾" OD, 1½" ID; 4½" OD, 2" ID; 4⅞" OD, 2⁷⁄₁₆" ID; 6⅜" OD, 3½" ID; and 7⅜" OD, 3¼" ID, and 12¾" OD, 11¾" ID. Similarly, the size of the stem socket can vary with the valve size, with more typical stem socket sizes including ⅜", ⁷⁄₁₆", ½", ⅝", ¾", and ⅞".

Valve subs as seen in FIG. 1 often are employed as well controls valves, one example of which is a standby or backup drill string safety valve (DSSV). There are many instances where it is necessary or advantageous during operations to stab a DSSV into the drill string at the rig floor level. The valve is stowed nearby in the open position and can be quickly stabbed in to the work string connection, made up, and then closed to seal the running string bore. Because the diameter of the tubular being handled on the rig floor can vary at different stages of the drilling project, it is typical to maintain several different sized DSSV's on hand at the drill sight, and these different DSSV's may have different stem socket sizes. Typically, when a DSSV is positioned within the drill string, a rig hand will use the wrench to engage the stem socket and manually open or close the valve. Given well conditions and the valve state of repair, opening or closing the valve may require application of considerable torque to the stem. And when the valve is under high pressure, this can potentially be a hazardous procedure for the rig hand. For example, a seal failure can result in a jet of high pressure fluid escaping from around the valve stem. More dangerously, the mechanical failure of the valve stem itself can turn portions of the valve stem into projectiles being ejected from the valve body at considerable velocities. This risk can arise in many well control events, such as a high pressure well kick. It would be a significant advance in the industry to provide a method and apparatus which allows safer and easier operation DSSV's at the rig site.

III. SUMMARY OF SELECTED EMBODIMENTS OF THE INVENTION

One embodiment of the present invention is a powered actuating assembly configured for mounting on a tubular valve body. The actuating assembly includes: (a) an actuator unit configured to impart torque to the valve stem; (b) an actuator mounting plate with a first surface supporting the actuator unit and a second surface configured to engage and resist movement relative to the valve body; and (c) securing links configured to extend around a valve body surface opposite the mounting plate and secure the mounting plate to the valve body.

Another embodiment is a method for actuating a valve sub assembly. The method begins with positioning a powered actuating assembly such as described above on a tubular valve body, wherein the valve body houses a valve and the valve stem is accessible from an exterior of the valve body. Then the securing links on the valve body are tensioned, and finally, toque is applied to the valve stem with the actuator unit.

IV. BRIEF DESCRIPTION OF THE DRAWINGS

Figure 2:
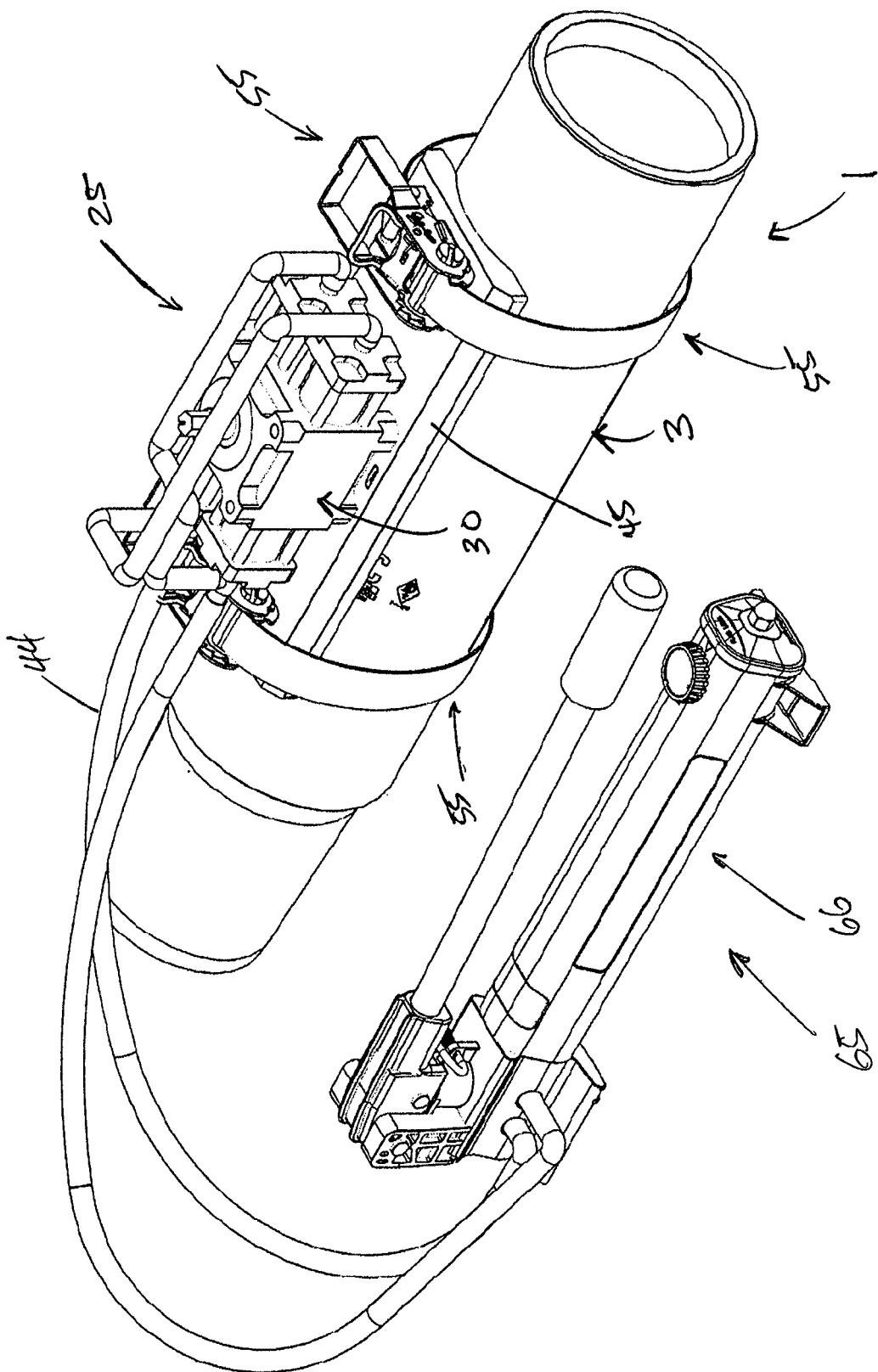
Figure 3:
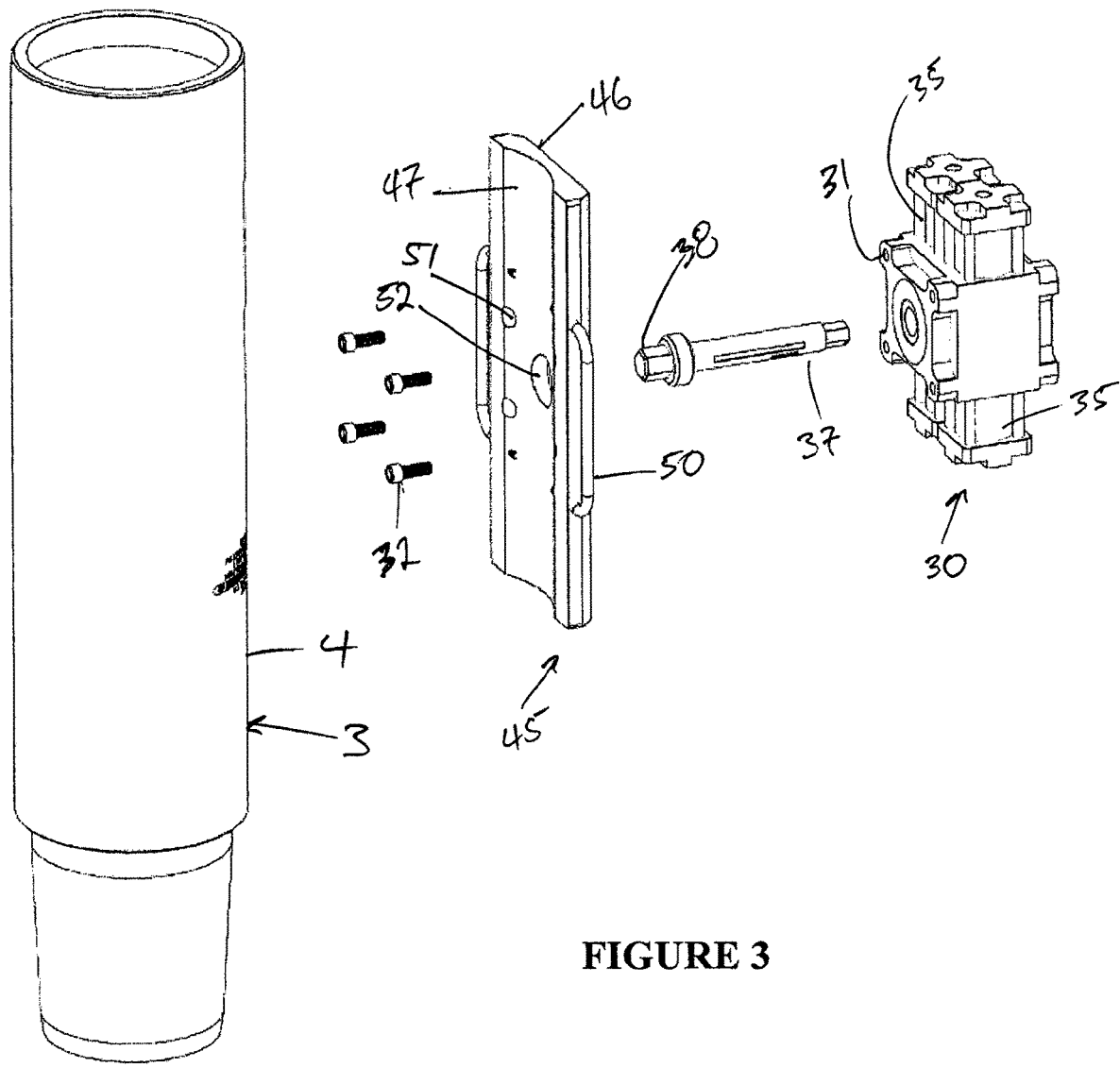
Figure 4:
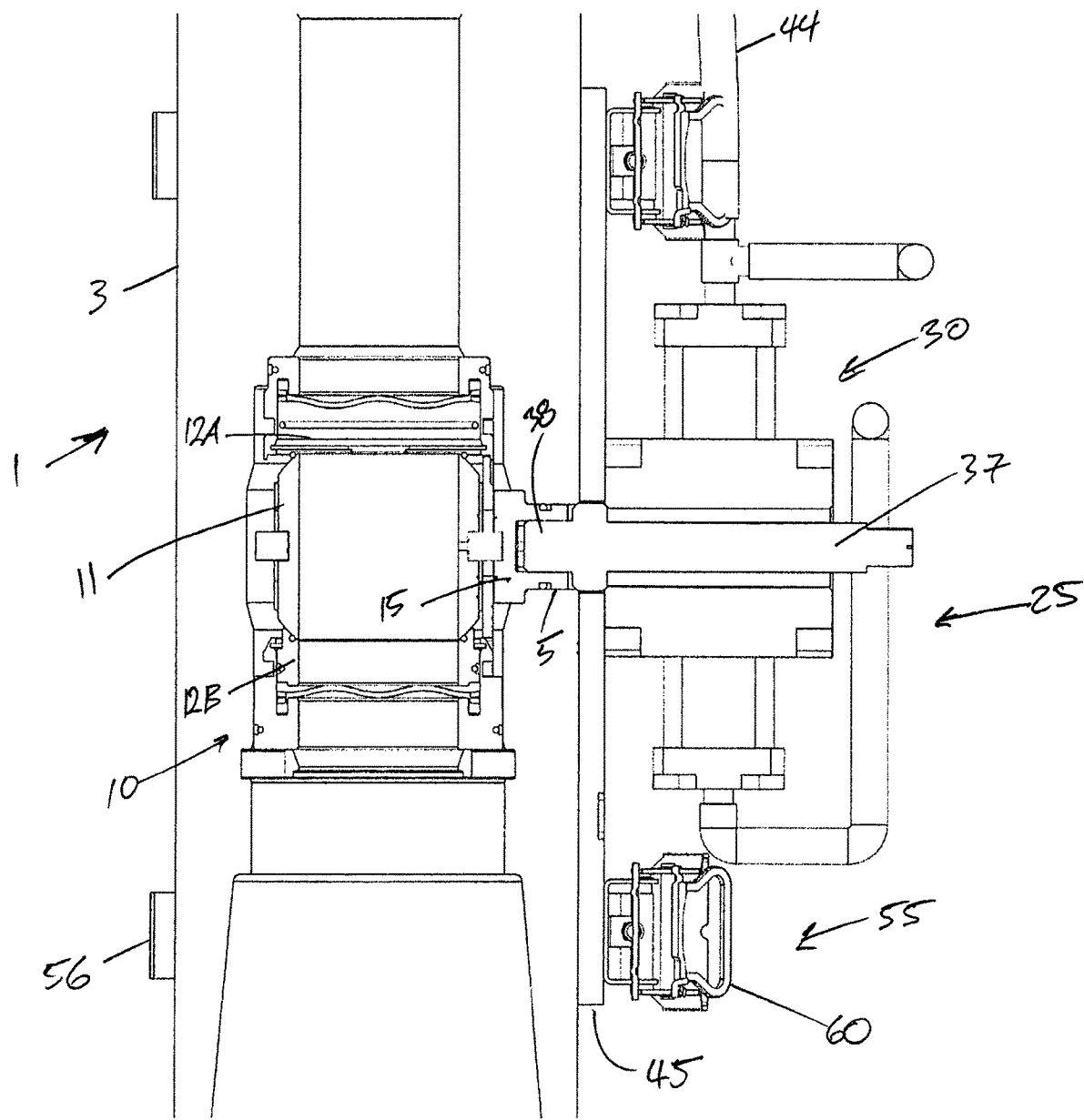
Figure 5:
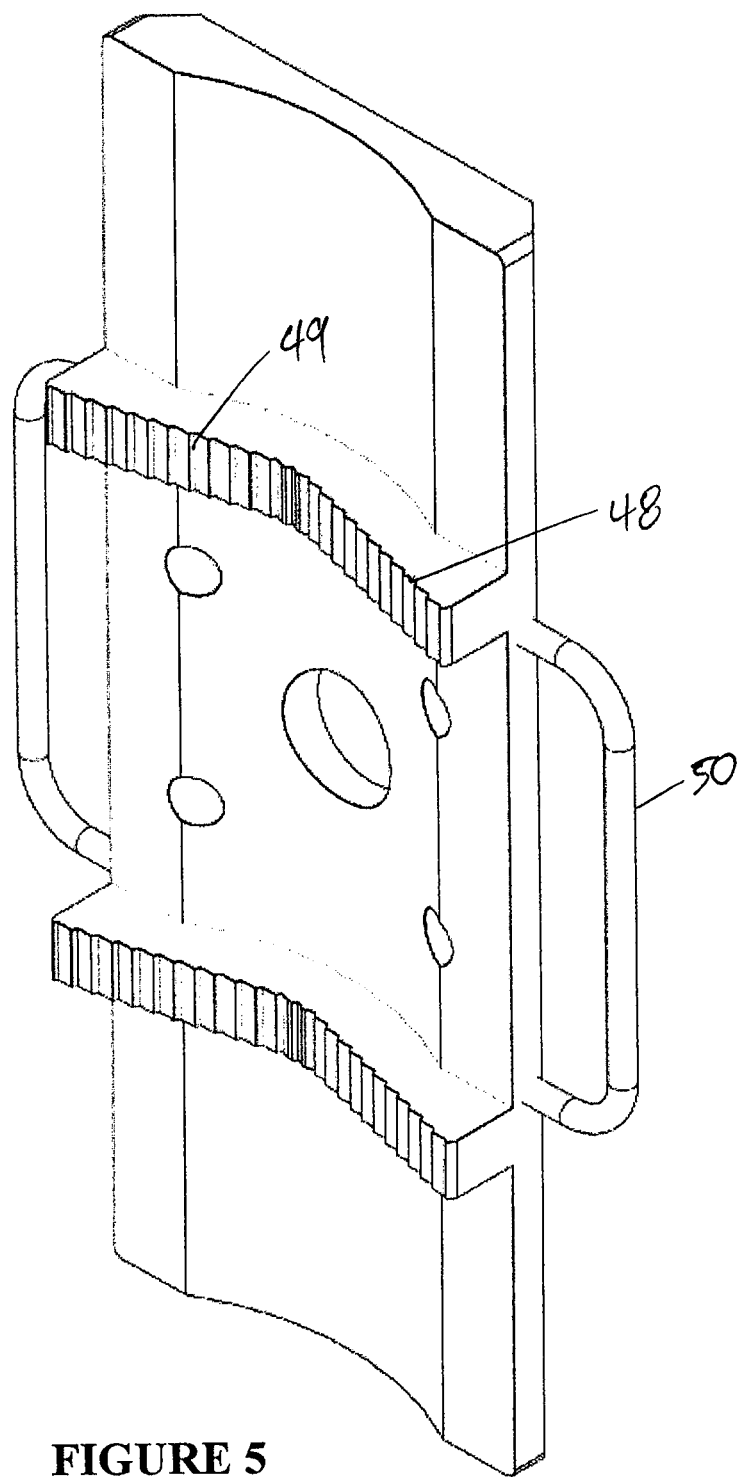

FIG. 1 is a cross-sectional view of a prior art valve sub.
FIG. 2 is a perspective view of one embodiment of the valve sub/actuator assembly of the present invention.
FIG. 3 is an exploded view of the FIG. 2 embodiment.
FIG. 4 is a cross-sectional view of the FIG. 2 embodiment.
FIG. 5 is a perspective view of an alternative mounting plate.

V. DETAILED DESCRIPTION OF SELECTED EMBODIMENTS

FIGS. 2-4 illustrate one embodiment of the valve sub/actuator assembly of the present invention. FIG. 2 shows the actuating valve sub assembly 1 consisting most generally of the tubular valve sub body 3 with the actuator assembly 25 attach to the valve sub body. In the particular embodiment of FIG. 2, the actuator assembly is hydraulically operated and the hydraulic fluid source 65 is a hand pump 66 such as a P391, Single Speed, Lightweight Hydraulic Hand Pump, available from Enerpac Tool Group of Menomonee Falls, Wisconsin. However hydraulic fluid source 65 could be any conventional or future developed fluid source, including electric pumps, battery pumps, or internal combustion engine driven pumps.

FIG. 2 also shows how the general components of actuator assembly 25 include the actuator unit 30, the mounting plate 45, and the securing links 55. As better seen in FIG. 3, the actuator unit 30 is formed by a battery of hydraulic piston and cylinder assemblies 35. The actuator stem 37 extends through the actuator unit 30 and torque is applied to the actuator stem 37 by the pistons or rams of piston/cylinder assemblies 35. In one particular embodiment, actuator unit 30 is a model of the Hydraulic Rotary Actuator capable of generating anywhere between 900 and 30,000 in/lbs and available from Moog Flo-Tork of Orrville, OH. Actuator unit is connected to a first surface 46 of mounting plate 45 by way of screws 32 extending through the screw holes 51 in mounting plate 45 and engaging the threaded apertures 31 on actuator unit 30.

In the FIG. 3 embodiment, the second side 47 of mounting plate 45 includes a curved surface configured to resist movement relative to the valve body, or more precisely, to resist torque applied to the valve stem. In other words, whatever torque actuator unit 30 applies to the valve stem of the valve sub, that degree of torque will be transferred to mounting plate 45 as a reaction force. Thus, mounting plate 45 needs to be secured against the tendency to rotate relative to valve sub body 3. As suggested in FIG. 3, second side 47 of mounting plate 45 includes a curved surface which has substantially the same curvature as that of the outer surface 4 of sub body 3. In certain examples, "substantially the same" means the radius of curvature of the second side 47 is within 20% (more preferably within 15%, 10%, or 5%) of the radius of curvature of sub body 3. In the FIG. 3 embodiment, it can also be seen that mounting plate 45 includes a C-shaped handle 50 on each of its long sides. Although rectangular in the illustrated embodiment, mounting plate 45 could take on other shapes.

An alternative manner of configuring the mounting plate to resist torque applied to the valve stem is suggested in FIG. 5. In this embodiment, the second side 47 of mounting plate will include at least two mounting wedges or notches 48. Preferably, the mounting wedges 48 include serrations 49 on their surfaces facing valve sub body 3, with these serrations running in a direction substantially parallel with the long axis of valve sub body 3. The mounting wedges 48 typically can accommodate a wider variation in sub diameter than the curved mounting plate shown in FIG. 3.

FIG. 4 illustrates a cross-section of the actuator assembly 25 attached to the sub body 3. This view shows the valve cartridge 10 with valve ball 11 positioned between valve seats 12A and 12B with the valve stem 15 positioned in the valve cavity 5 of the valve sub body 3. FIG. 4 also shows how actuator stem 37, via bit or tool head 38, engages the socket formed in valve stem 15. Similarly, it can be seen (in conjunction with FIG. 2) how the securing links 55 extend around the valve body surface opposite the mounting plate 45 and secure the mounting plate to the valve body 3. In one preferred embodiment, the securing links are straps or bands 56 of nylon, but could metal bands, chain, or any other suitable material. The ratcheting clasp 60 will allow the straps to be progressively tensioned in order to insure adequate force holds mounting plate 45 securely to valve body 3. Obviously many different arrangements could form the securing links 55. As one non-limiting example, the securing links could be formed of chain with a conventional chain tensioner acting as a clasp.

As suggested above, different sized valves have different sized valve stem sockets. Thus, different actuator stems will have different bit or tool head sizes, e.g., ⅜", ⁷⁄₁₆", ½", ⅝", ¾", and ⅞". In this scenario, the shank of the actuator stem which engages the actuator unit will be the same size. This allows a series of actuator stems with different tool head sizes to be used in the same actuator unit.

In one example method of using the actuator assembly 25, a set of at least two DSSV valve subs are provided at the rig site. At least two of the valve subs in the set have a different nominal diameter and a different sized valve stem socket. Along with the actuator assembly, a series of actuator stems will be provided which have different tool head sizes corresponding the differently sized valve stem sockets. When it is necessary to install one of the DSSV valve subs in the string, the valve sub is stabbed into the string in the conventional manner. Then the actuator stem having the tool head size corresponding to the valve stem is positioned within the actuator unit. Next, the mounting plate of the actuator assembly is positioned against the valve body with the tool head of the actuator stem engaging the valve stem socket. Then the straps 56 are positioned around the valve body and tensioned using the ratcheting clasp 60. When it becomes necessary to remove the DSSV from the drill string, the actuator assembly may be first removed, before the DSSV sub is broken out of the drill string and stowed at the rig site for future use. At a later time when the same or different sized DSSV needs to be stabbed into the drill string, the actuator assembly may be placed on this most recently installed DSSV. If the latest DSSV has a different valve stem socket size from the last DSSV handled, the actuator stem with the appropriate tool head size will be selected and installed on the actuator unit.

The term "about" as used herein will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or possibly as much as +/−20%. Similarly, the term "substantially" will typically mean at least 85% to 99% of the characteristic modified by the term. For example, "substantially all" will mean at least 85%, at least 90%, or at least 95%.

Although the invention has been described in terms of specific embodiments or examples, those skilled in the art will see many variations and modifications to those specific embodiments which fall within the scope of the current invention. For example, although the actuator unit is shown as being hydraulically actuated, there could be other "powered" actuator assembly embodiments utilizing electric or pneumatic actuators. Similarly, while the Figures show the valve stem having a socket engaged by the bit of a wrench, the valve stem could itself be a bit and the wrench have a socket "tool head." In some embodiments, the actuator unit may be used to ensure a sufficient degree of rotation (e.g., a full 90° or 180° as the case may be) has been applied to stem so as to fully open the valve. Likewise, the actuator unit, by controlling fluid pressure supplied to the unit, may be used to control and vary the degree of torque applied to the valve stem. All such variations and modifications should be considered within the scope of the present invention.

The invention claimed is:

1. An actuating valve sub assembly comprising:
   (a) a tubular valve body housing a valve and a valve stem accessible from an exterior of the valve body;
   (b) a powered actuating assembly mounted on the valve body, the actuating assembly comprising:
      (i) an actuator unit configured to impart torque to the valve stem;
      (ii) an actuator mounting plate with a first surface supporting the actuator unit and a second surface configured to engage and resist movement relative to the valve body; and
      (iii) securing links configured to extend around a valve body surface opposite the mounting plate and secure the mounting plate to the valve body;
   (c) a plurality of actuator stems, wherein each actuator stem has a different size tool head, wherein the actuator unit imparts torque to one of the actuator stems which engages the valve stem.

2. The valve sub assembly of claim 1, wherein the valve is a ball valve.

3. The valve sub assembly of claim 1, wherein the securing links are bands tensioned by a ratcheting clasp.

4. The valve sub assembly of claim 1, wherein the actuator unit is hydraulically powered.

5. The valve sub assembly of claim 1, wherein the second surface of the mounting plate has a curvature substantially corresponding to a curvature of an outer surface of the valve body.

6. The valve sub assembly of claim 1, wherein the second surface of the mounting plate includes at least two mounting notches configured to wedge against an outer surface of the valve body.

7. The valve sub assembly of claim 6, wherein the mounting notches have a serrated surface.

8. The valve sub assembly of claim 1, wherein the mounting plate includes a C-shaped handle on two sides.

9. A powered actuating assembly configured for mounting on a tubular valve body, wherein the valve body houses a valve and a valve stem accessible from an exterior of the valve body, the actuating assembly comprising:
  (a) an actuator unit configured to impart torque to the valve stem;
  (b) an actuator mounting plate with a first surface supporting the actuator unit and a second surface configured to engage and resist movement relative to the valve body, wherein the second surface has a curvature substantially corresponding to a curvature of an outer surface of the valve body; and
  (c) securing links configured to extend around a valve body surface opposite the mounting plate and secure the mounting plate to the valve body.

10. The valve sub assembly of claim 9, wherein the valve is a ball valve.

11. The valve sub assembly of claim 9, wherein the securing links are bands tensioned by a ratcheting clasp.

12. The valve sub assembly of claim 9, wherein the actuator unit is hydraulically powered.

13. The valve sub assembly of claim 9, wherein the actuator unit imparts torque to an actuator stem which engages the valve stem.

14. The valve sub assembly of claim 9, wherein the second surface of the mounting plate includes at least two mounting notches configured to wedge against an outer surface of the valve body.

15. The valve sub assembly of claim 14, wherein the mounting notches have a serrated surface.

16. The valve sub assembly of claim 13, further comprising a plurality of actuator stems, wherein each actuator stem has a different size tool head.

17. The valve sub assembly of claim 9, further comprising a manually powered hydraulic pump supplying hydraulic fluid to the actuator unit.

18. A method for actuating a valve sub assembly, the method comprising the steps of:
  (a) positioning a powered actuating assembly on a tubular valve body, wherein the valve body houses a valve and a valve stem accessible from an exterior of the valve body;
  (b) wherein the powered actuating assembly comprises:
    (i) an actuator unit configured to impart torque to the valve stem;
    (ii) an actuator mounting plate with a first surface supporting the actuator unit and a second surface configured to engage the valve body and resist torque applied to the valve stem, wherein the second surface has a curvature substantially corresponding to a curvature of an outer surface of the valve body; and
    (iii) securing links configured to extend around a valve body surface opposite the mounting plate and secure the mounting plate to the valve body;
  (c) tensioning the securing links on the valve body; and
  (d) applying toque to the valve stem with the actuator unit.

19. The method of claim 18, further comprising the step of supplying hydraulic fluid to the actuator unit using a manually powered hydraulic pump.

20. The method of claim 18, wherein the securing links are bands tensioned by a ratcheting clasp.

21. The method of claim 18, wherein the actuator unit imparts torque to an actuator stem which engages the valve stem.

* * * * *